Patented June 29, 1948

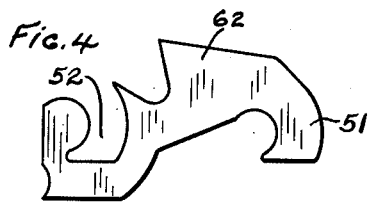
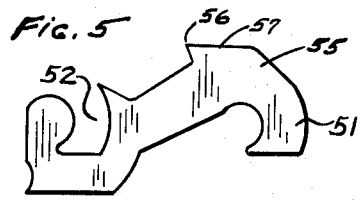
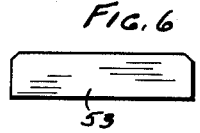
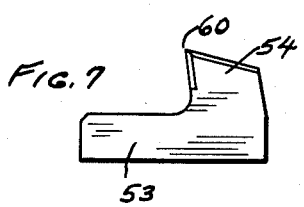
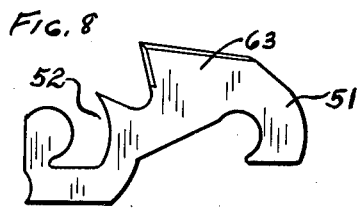
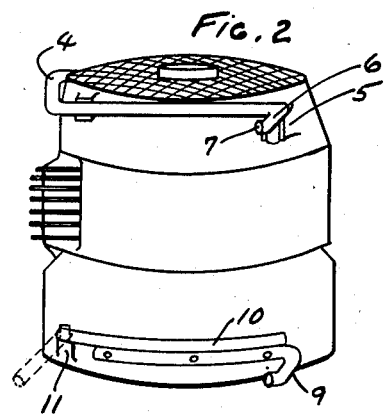
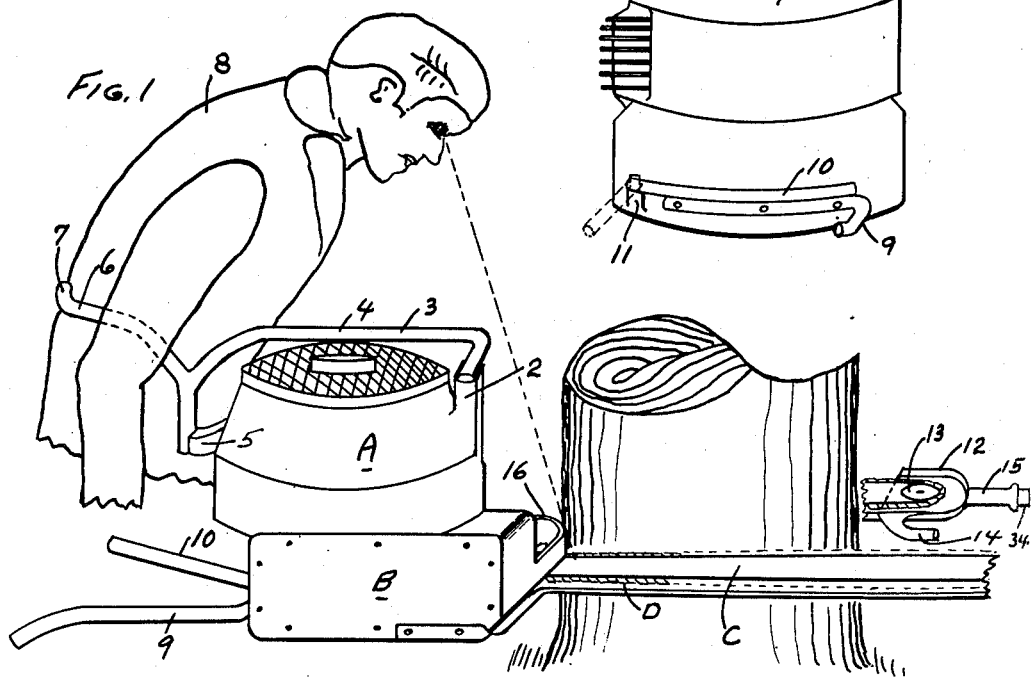

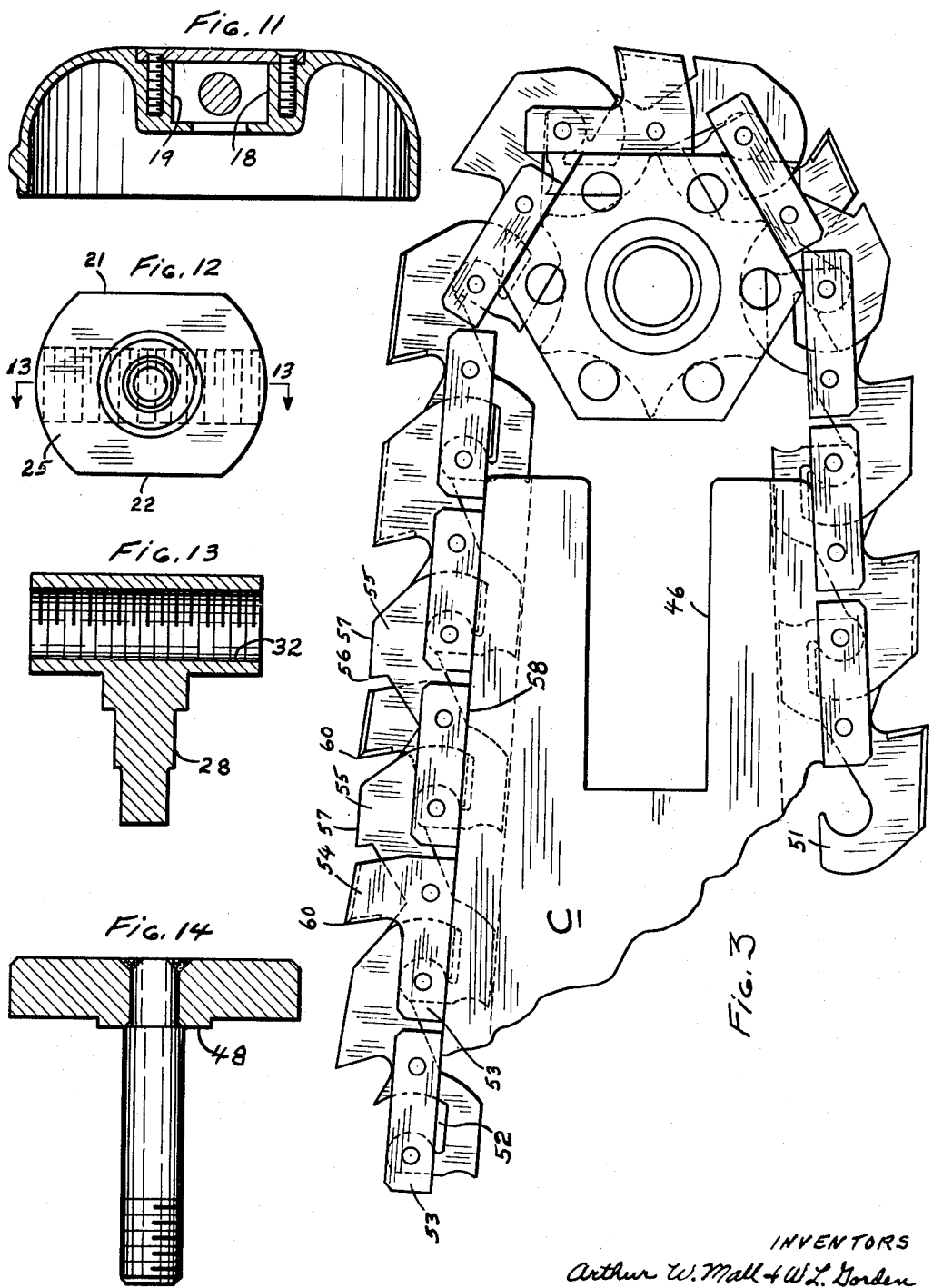

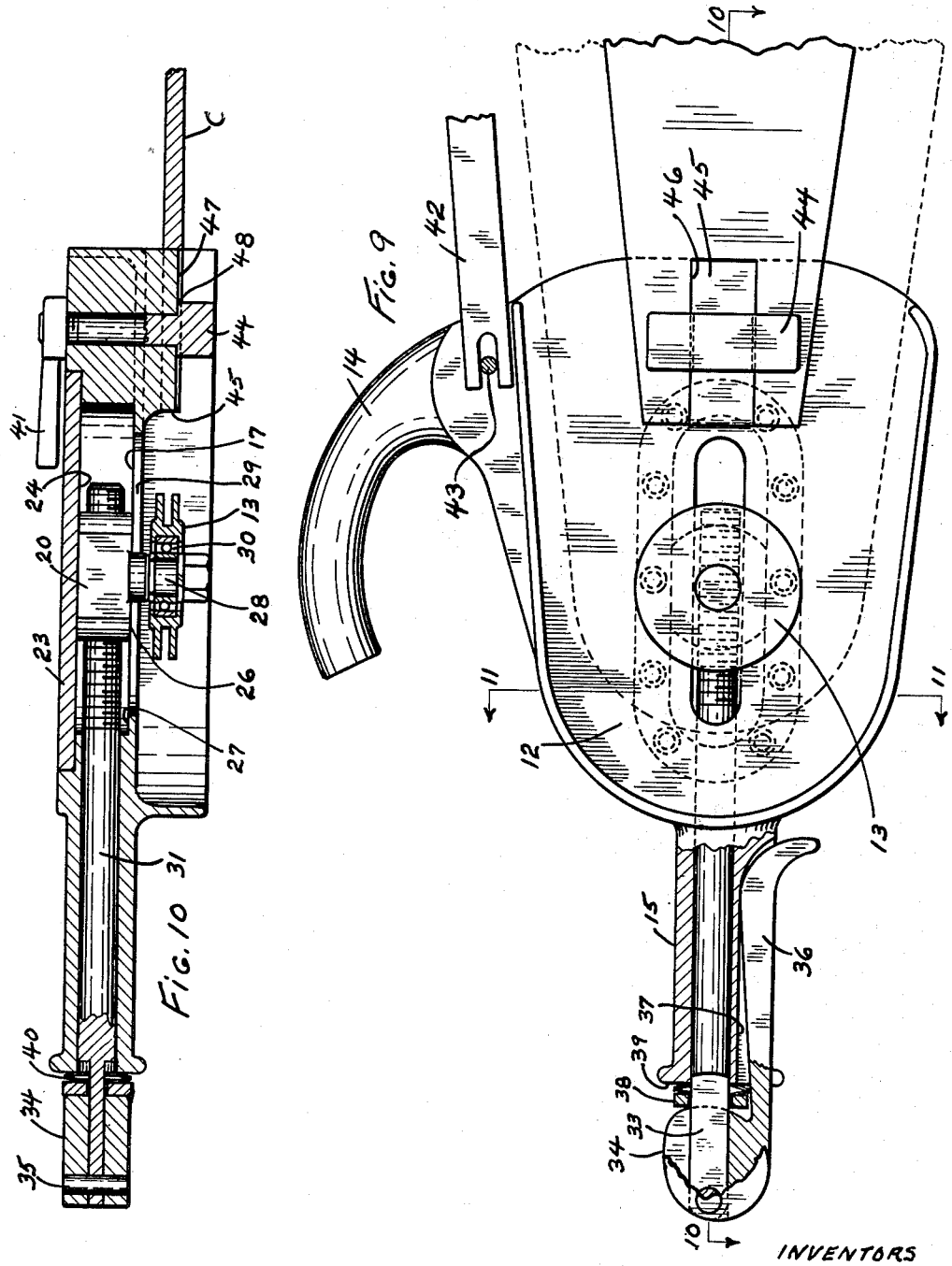

2,444,132

UNITED STATES PATENT OFFICE 2,444,132

CHAIN SAW MACHINE

Walter L. Gorden, Chicago, and Arthur William Mall, Flossmoor, Ill., assignors to Mall Tool Company, Chicago, Ill., a corporation of Illinois Application April 13, 1944, Serial No. 530,786

7 Claims. (Cl. 143—32)

Our invention relates to portable chain saw machines and has as its general object the provision of a new and improved chain saw machine.

One specific object of our invention is to provide an improved method of felling and cutting up timber.

Another object of our invention is to provide a new and improved cutting chain.

A further object of our invention is to provide means for quickly releasing the tension of the cutting chain so that the sprocket carrying frame member can be removed and the remainder of the chain saw machine can be withdrawn through the kerf of the log being cut.

Other objects and advantages of our invention will become apparent upon reading the following specification and upon examination of the drawings in which:

Fig. 1 is a perspective side view of our chain saw machine;

Fig. 2 is a perspective end view of our chain saw machine;

Fig. 3 is a fragmentary view of the cutting chain and drive sprocket;

Fig. 4 is a detail view of a raker tooth;

Fig. 5 is a detail view of a gauge-raker tooth;

Fig. 6 is a detail view of a connecting link;

Fig. 7 is a detail view of a combination connecting link and cutting tooth;

Fig. 8 is a detail view of a cutter-raker tooth;

Fig. 9 is a fragmentary view, partially in cross section, of the end of the chain saw machine opposite the power unit;

Fig. 10 is a cross sectional view taken on line 10—10 of Fig. 9;

Fig. 11 is a cross sectional view taken on line 11—11 of Fig. 9;

Fig. 12 is a detail view of the idler sprocket carrying member;

Fig. 13 is a cross sectional view taken on line 13—13 of Fig. 12; and

Fig. 14 is a cross sectional detail view of the clamping bolt.

Referring to Fig. 1, we have shown our improved chain saw machine which is comprised of a gasoline engine A, a fuel tank B, a chain guide member C, and a cutting chain D.

At the upper end of the gasoline engine A, a boss 2 receives one end of handle assembly 3. The handle assembly 3 is comprised of a U-shaped hand gripping portion 4, which embraces the upper region of the gasoline engine and then extends downwardly where it is secured to boss 5. A second hand gripping portion 6 extends outwardly from this U-shaped portion 4 and terminates with an arc-shaped portion 7.

It can be seen that the handle portion 6 rests comfortably against the side of the operator 8 helping him to support the weight of the chain saw machine while cutting a tree. Secured to the lower region of the fuel tank B is an outwardly extending handle 9 and (viewing Fig. 2) it can be seen that we have provided an auxiliary handle member 10 which is pivotally mounted on boss 11 so that it may be retained flat against the fuel tank when not in use, and then be swung out into operating position as shown in dotted lines in Fig. 2, when felling a tree.

Viewing Fig. 9 we have provided a frame member 12 at the end of the chain guiding member C opposite the gas engine A. This frame member 12 carries the idler sprocket 13. At the forward end of frame member 12 we have provided an upwardly and then rearwardly extending bumper handle 14 which serves a double function as will be later pointed out.

Referring to Fig. 1 it can be seen that when a tree is being felled, the operator who is holding the end of the chain saw away from the motor, can grasp handle portion 15 and the bumper handle 14. When the two operators handling the chain saw machine desire to rotate the entire machine from a bucking position to a felling position as shown in Fig. 1, one of the operators can assist in rotating the machine by applying side pressure against the bumper handle 14, during which time the other operator is hanging on to handle 9 and at the same time is pulling handle 10 outwardly into operating position. Then when this operator has handles 9 and 10 in each hand, he then moves his body up into contact with the motor, permitting handle 6 to partially embrace one side of his body. He can then lean forward, bending over the gasoline engine to a position where he can focus his eyes in the manner shown in Fig. 1.

The fuel tank B has an outwardly extending bumper guard 16 which continually rides against the tree during the cutting operation, due to the direction of rotation of the cutting chain which continually pulls the entire chain saw machine in a direction causing the bumper guard 16 to ride against the tree.

When the gasoline engine is first starting to operate, it is desirable to have the bumper guard 16 resting against the tree so that when the cutting chain engages the tree, there is no tendency for the chain saw machine to jump forward. If the bumper guard 16 is not resting against the tree, then the moment the cutting chain engages the tree, the entire chain saw machine jumps forward causing a severe jarring action when the bumper guard 16 reaches the tree. With our particular type of handle arrangement it is possible for the operator to lean over the engine where he can see how close the bumper guard 16 is to the tree when the chain saw machine is started.

When bucking a tree it is frequently desirable to withdraw the chain saw machine due to pinching. If the log which is being bucked is of a very wide diameter, the pinching wall cause the kerf to close up so that the chain saw machine cannot be withdrawn upwardly through the kerf, consequently it is sometimes necessary to withdraw the chain saw machine by pulling it horizontally through the kerf. In order to do this, it is necessary to remove frame member 12 and its associated parts from the chain guiding member C so that the cutting chain and the chain guiding member C can be pulled through the kerf. We have provided means for quickly removing frame member 12 and its associated parts from guide member C.

The cutting chain D (which is trained about the chain guiding member C and the idler sprocket 13) must be removed from sprocket 13 before the frame member 12 can be withdrawn from guide member C. We have provided means for quickly removing the chain from sprocket 13 as will be hereinafter described in the two succeeding paragraphs.

Frame member 12 is provided with an elongated chamber 17 which has parallel side walls 18 and 19. Sprocket carrying member 20 rides in chamber 17 and has rectilinear side walls 21 and 22 which ride against the side walls 18 and 19 (Fig. 11) of chamber 17. A cover 23 covers the open end of chamber 17 and provides a bearing surface 24 against which the upper surface 25 (Fig. 12) of sprocket carrying member 20 rides. The underneath surface 26 of sprocket carrying member 20 rides on the bottom wall 27 of chamber 17. Thus it can be seen that sprocket carrying member 20 is capable of rectilinear movement only within chamber 17.

A shaft portion 28 extends downwardly from sprocket carrying member 20 and is preferably integral therewith. Shaft 28 extends through slot 29 in the bottom wall 27 of chamber 17. Sprocket 13 is mounted on the stationary shaft 28 and rotates thereon by means of anti-friction bearing 30. An elongated rod 31 is journaled through handle portion 15 and is screw-threadedly received in the threaded bore 32 (Fig. 13) of sprocket carrying member 20 so that the sprocket carrying member may be adjusted relative to rod 31 by rotation of rod 31. At the outer end of rod 31 a flattened portion 33 protrudes beyond the outer end of handle 15. A cam 34 is pivotally mounted on bar 33 by means of pivot pin 35 and is free to rotate about pin 35. Cam 34 is provided with a manipulating lever 36 which is normally housed in an elongated slot 37, formed in the underneath side of handle 15. A washer 38 is interposed between the cam 34 and the outer end 39 of handle 15. A spring 40 (preferably Belville washer type) is interposed between the washer 38 and the outer end 39 of handle 15. It can be seen that when lever 36 is pulled outwardly, cam 34 permits rod 31 to move inwardly, thereby moving sprocket 13 along therewith, and consequently releasing the tension on cutting chain D, permitting the chain to be removed from sprocket 13. When the cutting chain is thus removed from the sprocket 13, all that remains to do is to loosen wing nut 41 and a second wing nut (not shown) which fastens guard bar 42 to frame member 12 by means of bolt 43. When these two wing nuts are loosened, the frame member 12 and its associated parts can be quickly withdrawn away from chain guiding member C, thereby permitting the guide member C and cutting chain D to be withdrawn horizontally through the kerf.

It will be noted that frame member 12 is secured to chain guide member C by means of clamping bolt 44 and wing nut 41. A tongue portion 45 is formed on frame member 12 and is adapted to be received in slot 46 of guide plate C. It will be noted that the plane defined by the outer surface 47 of tongue 45 is above the plane defined by the underneath surface of chain guide member C (as shown in Fig. 10). Thus clamping bolt 44 is provided with a key portion 48 (Fig. 14) which extends into the slot 46 so as to prevent the clamping bolt 44 from rotating when wing nut 41 is tightened. It can likewise be seen that wing nut 41 needs to be loosened only a small amount before frame member 12 can be withdrawn away from chain guide member C.

When it is desired to adjust the tension of the cutting chain slightly, lever 36 is pulled outwardly sufficiently far so that rod 31 can be rotated relative to handle 15, thereby causing sprocket carrying member 20 to be adjusted axially of rod 31. When rod 31 has been rotated one or more revolutions, then lever 36 is again housed in slot 37. It can be seen that connecting chain D is maintained under a slight amount of resilient tension at all times as a result of spring 40.

Referring to Fig. 3, we have shown our improved cutting chain. This chain is of the loose link type as shown in co-pending applications, Serial Nos. 510,409 and 517,442 (issued as Patent No. 2,435,892, Feb. 10, 1948). The cutting chain is assembled by inserting the tail 51 of each tooth into the mating slot 52 of each succeeding tooth as is fully explained in the above-mentioned co-pending application, Serial No. 510,409. We have found that improved cutting action is achieved by providing one of the connecting links 53 with a cutting tooth portion 54 which enables us to have a greater number of cutting teeth per lineal foot of chain. Thus the connecting link 53 serves the double function of serving as a side retaining wall for the tail portion 51 of the preceding tooth and also as a cutting tooth.

We have also provided in our cutting chain a "gauge-raker" tooth 55 which serves a double function of acting as a depth gauge for limiting the cutting depth of the cutting teeth 54 as well as raking saw dust through the kerf.

It is to be noted in viewing Fig. 3 that the "gauge-raker" tooth 55 has a nose portion 56 which serves the function of scraping saw dust through the kerf. Tooth 55 also has a riding surface 57 which is substantially parallel with the periphery 58 of chain guide member C thereby assuring a minimum amount of cutting or scraping action by the nose 56 since it is the function of "gauge-raker" tooth 55 to serve as a depth gauging device as well as a saw dust raking device. It is to be noted that the riding surface 57 of tooth 55 is located in a plane which is approximately $\frac{1}{32}$" below the plane of the cutting nose 60 of each cutting tooth 54, consequently surface 57 rides on the bottom of the kerf, thereby limiting the depth of the cutting action of cutting tooth 54.

Teeth 62 and 63 (Figs. 4 and 8) are additional raker teeth which assist in cutting and raking saw dust through the kerf.

Having thus described our invention, what we claim is:

1. A chain saw machine comprising a power unit, a chain guiding member extending from said power unit, a drive sprocket associated with the power unit and driven thereby, an idler sprocket at the outer end of the chain guiding member, a cutting chain trained about the sprockets and chain guiding member, a frame movably secured to the outer end of the chain guiding member, an elongated chamber in the frame having parallel side walls, a sprocket carrier journalled in the chamber and movable therein, a rod screw-threaded in the carrier and having an end protruding beyond the outer end of the frame, a washer on the rod, a spring interposed between the washer and the outer end of the frame, a cam pivotally mounted on the rod and engaging the washer, a lever secured to the cam for actuating the rod and sprocket carrier whereby to release the tension on the cutting chain, said lever also serving to actuate the rod rotatably whereby to vary the tension on the cutting chain.

2. A chain saw machine comprising a power unit, a chain guiding member extending from said power unit, a drive sprocket associated with the power unit and driven thereby, an idler sprocket at the outer end of the chain guiding member, a cutting chain trained about the sprockets and chain guiding member, a frame member secured to the outer end of the chain guiding member, an elongated chamber in the frame having parallel side walls, a sprocket carrier journalled in the chamber and movable therein, an elongated slot in the bottom wall of the chamber, said sprocket carrier having a shaft portion protruding through the slot, a rod screw-threaded in the carrier and having an end protruding beyond the outer end of the frame, a washer on the rod, a spring interposed between the washer and the outer end of the frame, a cam pivotally mounted on the rod and engaging the washer, a lever secured to the cam for actuating the rod and sprocket carrier whereby to release the tension on the cutting chain.

3. A chain saw machine as described in claim 1 wherein a slot is formed in the outer end of the frame member, said lever being normally housed in said slot.

4. A chain saw machine comprising a power unit, a chain guiding member extending from said power unit, a drive sprocket associated with the power unit and driven thereby, an idler sprocket at the outer end of the chain guiding member, a cutting chain trained about the sprockets and chain guiding member, a frame member at the outer end of the chain guiding member, said frame member having a wall portion, a tongue portion at one end of the wall, said chain guiding member having a slot adapted to receive the tongue portion, a bolt extending through the tongue portion and protruding exteriorly of the frame member, a head portion for said bolt, said head portion extending across the slot and having contact at each end with the chain guiding member, said head portion having side walls extending into the slot to prevent rotation of the bolt, a nut threaded onto the bolt at the end opposite the head portion.

5. A chain saw machine comprising a power unit, a chain guiding member extending from said power unit, a drive sprocket associated with the power unit and driven thereby, an idler sprocket at the outer end of the chain guiding member, a cutting chain trained about the sprockets and chain guiding member, a frame member secured to the outer end of the chain guiding member, an elongated chamber in the frame member having parallel side walls, a sprocket carrier journalled in the chamber and movable therein, said carrier having rectilinear side walls adapted to ride against the side walls of the chamber, a rod screw-threaded in the carrier and having an end protruding beyond the outer end of the frame, a washer on the rod, a spring interposed between the washer and the outer end of the frame, a cam pivotally mounted on the rod and engaging the washer, a lever secured to the cam for actuating the rod and sprocket carrier whereby to release the tension on the cutting chain.

6. A chain saw machine comprising a power unit, a chain guiding member extending from the power unit, a cutting chain trained about the chain guiding member, a handle assembly secured to the upper end of the power unit comprising a U-shaped portion embracing the upper region of the power unit, a handle portion extending rearwardly away from the power unit, an arc-shaped portion at the outer end of the handle portion, a second handle member secured to the lower region of the power unit and extending rearwardly away from the power unit, and a third handle member pivotally secured to the lower region of the power unit.

7. A chain saw machine comprising a power unit, a drive sprocket associated with the power unit and driven thereby, a chain guiding member extending outwardly from the power unit including an arcuate guide portion spaced from the drive sprocket and disposed adjacent to the outer end of the guiding member, a cutting chain trained about the sprocket, a mounting assembly for supporting the arcuate guide portion for relative linear movement longitudinally along the guiding member comprising a carrier slidably mounted on the guiding member for movement longitudinally thereof, and a rod screw-threaded in the carrier and slidably supported for lengthwise movement on the guiding member, and an arm pivotally mounted on a support disposed adjacent to one end of the rod about an axis disposed at right angles to the length of the rod, said support being rotatable about an axis corresponding to the longitudinal axis of the rod and being operatively connected to the rod for rotating the rod.

W. L. GORDEN.
ARTHUR WILLIAM MALL.

REFERENCES CITED

The following references are of record in the file of this patent:

UNITED STATES PATENTS

| Number | Name | Date |
|---|---|---|
| 873,666 | Gray et al. | Dec. 10, 1907 |
| 945,599 | Purser | Jan. 4, 1910 |
| 1,116,574 | Deneen | Nov. 10, 1914 |
| 1,178,362 | Wall | Apr. 4, 1916 |
| 1,342,213 | Hanson et al. | June 1, 1920 |
| 1,356,169 | Peters | Oct. 19, 1920 |
| 1,617,565 | Bens | Feb. 15, 1927 |
| 1,892,246 | Mohns | Dec. 27, 1932 |
| 1,903,571 | Meyer | Apr. 11, 1933 |
| 1,952,270 | March et al. | Mar. 27, 1934 |
| 2,109,702 | Lange | Mar. 1, 1938 |
| 2,326,854 | Hassler | Aug. 17, 1943 |

FOREIGN PATENTS

| Number | Country | Date |
|---|---|---|
| 274,348 | Great Britain | July 20, 1933 |
| 506,310 | Germany | Sept. 2, 1930 |
| 581,061 | Germany | July 20, 1933 |
| 402,765 | Great Britain | Nov. 28, 1933 |